March 22, 1949. K. A. KAIL 2,465,158
AVIATION TRAINER
Filed May 4, 1943 5 Sheets-Sheet 1

FIG. 1

KARL A. KAIL
*INVENTOR.*

BY
ATTORNEYS.

KARL A. KAIL
*INVENTOR.*

March 22, 1949.   K. A. KAIL   2,465,158
AVIATION TRAINER

Filed May 4, 1943   5 Sheets-Sheet 5

FIG. 6

KARL A. KAIL
*INVENTOR.*

BY
ATTORNEYS.

Patented Mar. 22, 1949

2,465,158

UNITED STATES PATENT OFFICE 2,465,158

AVIATION TRAINER

Karl A. Kail, Montrose, Pa., assignor to Link Aviation, Inc., a corporation of New York Application May 4, 1943, Serial No. 485,573

10 Claims. (Cl. 35—10)

My invention relates to grounded aviation trainers for the instruction of students in the art of flying and navigating and is particularly useful in a trainer of the type disclosed in United States Patents 1,825,462 and 2,099,857.

A trainer of this type is commonly referred to as a "Link trainer" and such a trainer constitutes essentially a simulated aircraft fuselage mounted upon a universal joint in order that the trainer may be turned, pitched and banked in simulation of the corresponding maneuvers of a plane in actual flight. The above-mentioned U. S. Patent 2,099,857 discloses means whereby the functioning of certain of the instruments in an airplane such as the altimeter, vertical speed indicator and air speed indicator may be simulated in such a trainer. United States Patent 2,179,663 discloses and claims a recorder which traces the simulated "flight" of such a trainer. The copending application Serial No. 406,056 filed August 8, 1941, of Gunne Lowkrantz and myself discloses a wind drift instrument for use in connection with such a trainer.

It is a principal and general object of my invention to provide means whereby the functioning of the instruments in a plane in actual flight may be more accurately simulated in such a trainer.

It is a more specific object of my invention to provide means whereby the functioning of the air speed indicator in a plane in actual flight may be more accurately simulated in a grounded aviation trainer.

It is another object of my invention to provide means whereby the functioning of the air speed indicator in such a trainer and the recorder associated with the trainer may be more perfectly intergrated.

It is another object of my invention to provide means whereby a time lag may be introduced between a change in the throttle setting or attitude of the fuselage and a change in the speed of forward movement of the recorder.

A further object of my invention is to provide means whereby the air speed indicator may be made to give an indication less than the assumed true air speed of the trainer in accordance with the assumed altitude and assumed temperature of the air surrounding the trainer, while the forward movement of the recorder is proportional to the assumed true air speed of the trainer.

It is a further object of my invention to provide means whereby the speed of the recorder and the assumed air speed as indicated by the air speed indicator of the trainer may be varied according to the assumed conditions of flight of the trainer.

It is a further object of my invention to make these new results possible by combining the novel parts of my invention with the trainer, recorder and wind drift instrument.

These and other objects of my invention will become clear as the description of the accompanying figures proceeds. In the figures, wherein like reference numerals indicate like parts.

Figure 1:
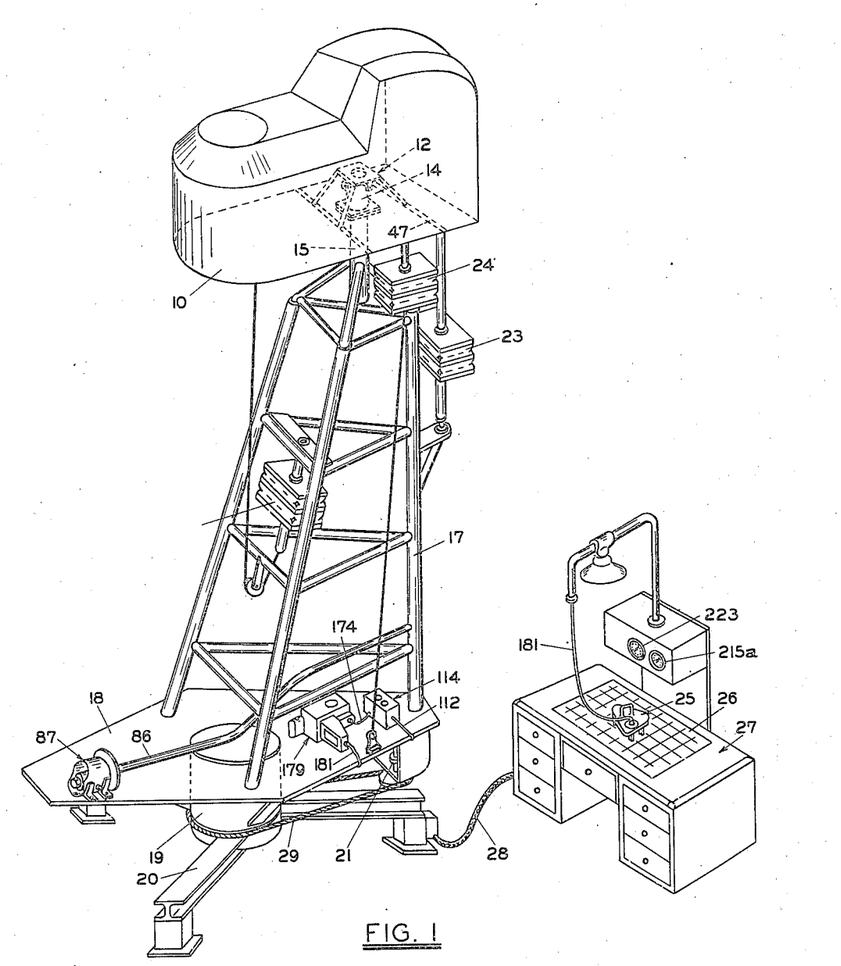
Fig. 1 is a general view of such a trainer together with the instructor's desk and recorder.

Referring to Fig. 1, it will be seen that such a trainer comprises a fuselage 10 mounted upon a universal joint designated generally as 12 which in turn rests upon a central supporting member 14. Central supporting member 14 is rigidly mounted upon shaft 15 which is integral with the upper part of tower 17 which in turn is rigidly mounted upon platform 18. By means of a suitable bearing arrangement within hub 19, which is supported by base 20, tower 17 and fuselage 10 may be rotated about their vertical axes through 360°. Turning motor 21 is responsive to the movements of the rudder pedals (not shown) inside the fuselage 10, so that when the rudder pedals are manipulated by the student in the trainer, the turning motor 21 is actuated and by means of belt 29, the platform 18, tower 17 and fuselage 10 turn about their vertical axes in simulation of the turning of a plane in actual flight in response to its rudder pedal movements. It is to be noted that base 20 does not turn, turning motor 21 rotating platform 18, tower 17 and fuselage 10 with respect to base 20.

When the control column (not shown) inside the trainer fuselage 10 is pushed forward, bellows 22 is collapsed while bellows 23 is expanded and the fuselage 10 assumes a diving attitude. Pulling back of the control column, on the other hand, causes bellows 23 to collapse and bellows 22 to expand, and the fuselage 10 assumes a climbing attitude. By means of bellows 24 and a companion bellows (not shown) under the right side of the fuselage 10, the fuselage may be made to bank in response to control column movements in simulation of the banking of a plane in response to corresponding control column movements. These pitching and tilting movements are made possible by the mounting of fuselage 10 upon universal joint 12, and inasmuch as the means for accomplishing these tilting, pitching and turning movements of the trainer fuselage 10 are completely disclosed and claimed in the two above-mentioned United States Patents Numbers 1,825,462 and 2,099,857, they form no part of the present invention except in combination with the novel means of this invention to be described hereinafter.

Also seen in Fig. 1 is the recorder 25 which is mounted upon a chart or map 26 which is upon the top of desk 27. This recorder is electrically connected to the trainer 10 by means of cable 28, and as shown in the above-mentioned U. S. Patent 2,179,663, the recorder responds to every directional change in the heading of the trainer and moves forward at a constant rate over the chart upon which it is placed, tracing the simulated path of flight, or "track," of the trainer.

In a plane in actual flight, an air speed indicator is provided which indicates at all times, except for unavoidable errors due to altitude and temperature, the speed with which the ship is moving through the mass of air surrounding it. It will be readily understood that for any given load condition this indicated air speed, disregarding effects due to altitude and temperature, depends upon two factors, viz., throttle setting (or power output) and attitude. For example, the farther open the throttle is the faster the plane will travel through the air. Also, if the plane be in a climbing attitude, its speed will be less than in level flight and if it be in a diving attitude its speed will be greater than in level flight. The immediately foregoing statements presume other factors remaining constant.

The above-mentioned U. S. Patent 2,099,857 discloses and claims means for causing an air speed indicator in such a trainer to respond to changes in the position of the throttle in the trainer as well as to changes in the attitude of the fuselage of the trainer, in simulation of the response of the air speed indicator in a plane in actual flight to changes in the throttle position and attitude of the plane. But, as explained previously, the recorder disclosed in U. S. Patent 2,179,663 moves over the chart at a constant rate regardless of the assumed air speed of the trainer. In other words, the speed of travel of a recorder such as is therein disclosed is not affected by the throttle position or the attitude of the trainer. It is clear, therefore, that such a recorder will not accurately record the assumed flight of the trainer in the event that during its flight the trainer changes its assumed air speed. With an increase in assumed air speed, in the absence of any other change in conditions, a plane would of course pass over the ground at a more rapid rate and, therefore, if the recorder is to accurately trace the simulated flight of the trainer, its speed of travel over the chart or map should also be greater with an increase in the trainer's assumed air speed. In the event of a decrease in the assumed air speed of the trainer the speed of the recorder should be less. In other words, the speed of the recorder's movement over the chart should at all times be proportional to the assumed air speed of the trainer. The aforementioned copending application of Gunne Lowkrantz and myself, Serial No. 406,056 for Wind drift instrument, discloses means for automatically varying the speed of the recorder in accordance with changes in the assumed air speed of the trainer. As has been stated, my present invention provides, among others, means for improving the combination of trainer, wind drift instrument and recorder. (This same copending application also discloses means for varying the speed of the recorder in accordance with other assumed factors, but for the purposes of this application these other uses need not be described.)

*Effects of changes in throttle position and pitch action on air speed regulator bellows*

Figure 2:
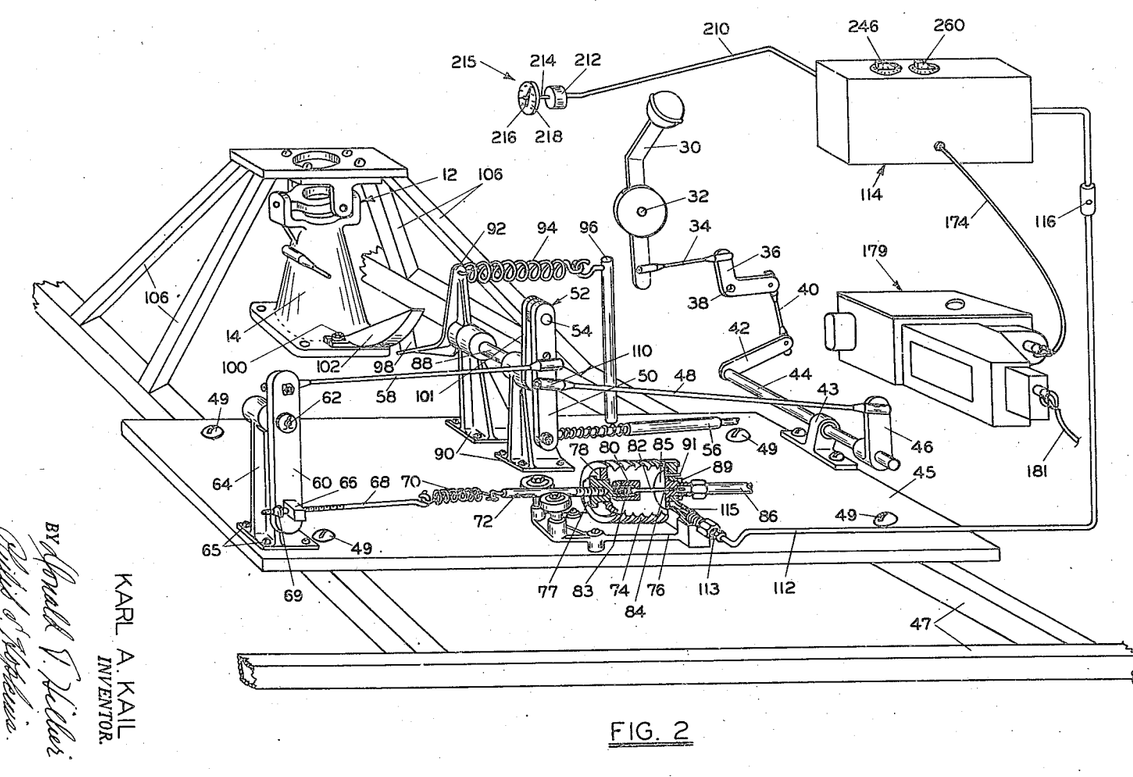
Fig. 2 is a general schematic view showing part of the frame-work of the fuselage, universal joint, throttle, air speed regulating bellows as well as connecting linkages together with the air speed transmitter, wind drift instrument, and air speed indicator.

Reference is now made to Fig. 2 wherein is shown a throttle 30 which is pivotally mounted upon a shaft 32 which may in turn be suitably mounted upon any part of the trainer fuselage. To the lower end of throttle 30 is pivotally attached one end of link 34, the other end of which is pivotally attached to the upper end of bell crank 36. Bell crank 36 pivots at the point 38 and to the lower end of it is pivotally attached the upper end of vertical link 40. The lower end of this vertical link is pivotally attached to arm 42. The end of this arm foremost in respect to the trainer fuselage 10 is rigidly affixed to shaft 44 which extends laterally of the trainer fuselage and is mounted for rotation in brackets 43, only one of which is shown, which brackets are rigidly affixed to member 45 which is rigidly affixed to the frame 47 of fuselage 10 by means of bolts 49. To the right end of this shaft 44 is rigidly affixed vertical arm 46 and to the upper end of this arm is pivotally attached link 48, the front end of which is in turn pivotally attached to arm 50 of walking beam designated generally by 52. Arm 50 in turn is pivotally attached to stub shaft 54 and to the lower end of this arm is pivotally attached member 56 which goes to the climb dive valves, the functioning of which is completely disclosed in the U. S. Patent 2,099,857. These valves are not shown in this application because they form no part of the present invention.

Also pivotally connected to arm 50 is another link 58, the foremost end of which, as related to the head of the trainer fuselage 10, is pivotally attached to the upper end of lever 60 which is pivoted about the shaft 62 integral with bracket 64 which in turn is attached to the platform 45 of the trainer fuselage 10 by means of screws 65. Extension 66 mounted upon the lower end of arm 60 is bored for the reception of the foremost end of link 68, to the other end of which is attached spring 70. The other end of this spring is attached to link 72.

The numeral 74 designates an air-proof bellows preferably made of light metal construction, and this bellows is mounted upon a frame member 76 which in turn is mounted upon the platform 45 inside the trainer fuselage 10.

The forward end plate 78 of bellows 74 is formed airtight with the bellows and the rear end of link 72 is threaded into retainer 77 which in turn is threaded into forward end plate 78. Cap 80 is threaded onto the rear end of retainer 77 and holds needle 82 in proper position. Spring 83 is held in a counterbore in retainer 77 by means of needle 82. Spring 83 prevents damage to needle 82 in the event bellows 74 becomes inadvertently collapsed. The rear end plate 85 of bellows 74 is formed airtight with the bellows and has a suitable seat 84 therein to form with the needle 82 a needle valve. Rear plate 85 has a threaded extension extending through frame 76 and nut 89 is screwed thereon to hold the bellows 74 in position. Positioning stud 91 is also provided. Hollow tubing 86 is connected with turbine 87 shown in Fig. 1, which turbine provides a source of reduced air pressure of constant level. Whenever the needle valve is open it will be readily understood that the pressure within bellows 74 will become lowered.

Referring still to Fig. 2, horizontal shaft 88 is mounted for rotation in brackets 90, the lower ends of which are suitably affixed to the platform 45 inside the trainer fuselage 10. The right end of shaft 88, in relation to its position relative to the trainer fuselage 10, which end is nearer central support 14, has rigidly affixed thereto pitch action lever 92 to the upper end of which is attached a tension spring 94, the rear end of which is attached to member 96 which in turn is rigidly affixed to the platform 45. The lower end of lever 92 has suitably mounted thereupon a roller 98, and rigidly affixed to the base of central support 14 by means of bolts 100 is pitch action cam 102 which is adapted to cooperate with roller 98 whenever the trainer fuselage is pitched, as will be explained. Roller 98 and cam 102 comprise what is commonly referred to in the art as the "pitch action take-off." Arm 101 is rigidly affixed to the left end of shaft 88 and stub shaft 54, to which reference has been previously made, is rigidly mounted to the upper end of arm 101.

As seen in Figs. 1 and 2, base 47 and brackets 90 and 64 and the base 76 of the air speed regulator bellows 74 are all suspended below universal joint 12 by means of members 106. Whenever the trainer fuselage 10 pitches in simulation of the climbing of a plane in actual flight, the platform 45 also assumes a climbing attitude and it also swings ahead of its level flight position, carrying with it brackets 90 and 64, as well as frame 76 and the air speed regulator bellows 74.

Roller 98 cannot move forward because pitch action cam 102 engages this roller. Brackets 90 therefore move with respect to pitch action lever 92 as though roller 98 and the lower end of the lever were pushed toward the rear of fuselage 10, i. e., to the right in Fig. 2. The upper end of arm 101 and stub shaft 54 therefore move toward the head of the trainer fuselage as does the upper end of arm 50 which in this instance pivots about the point 110 where link 48 attaches thereto. Link 58 and the upper end of lever 60 move ahead, the bottom of lever 60 moving to the rear, decreasing the tension upon spring 70. The resulting decrease in the tension upon spring 70 allows the atmospheric pressure upon the outside of bellows 74 to collapse this bellows and the opening of the needle valve therewithin is reduced in size, the extent of this reduction depending upon the amount of change in the attitude of the trainer. The vacuum source 87 which, it will be recalled, is connected by means of tube 86 to bellows 74, will therefore not have as large an orifice to work through and, by means to be later described, the pressure within this bellows will increase.

On the other hand, if the trainer fuselage 10 is pitched in simulation of the diving of a plane in actual flight, platform 45 also assumes a diving attitude and it swings behind its level flight position, carrying with it brackets 90 and 64 as well as frame 76 and the air speed regulator bellows 74. Tension spring 94 pulling upon the top of pitch action lever 92 will maintain roller 98 in contact with pitch action cam 102. Brackets 90 therefore move with respect to pitch action lever 92 as through roller 98 and the lower end of the lever were pushed toward the head of fuselage 10, i. e., to the left in Fig. 2. The upper end of arm 101 and stub shaft 54 therefore move toward the rear of the trainer fuselage as does the upper end of arm 50 which in this instance pivots about the point 110 just as in the case where the trainer fuselage 10 is pitched in simulation of the climbing of a plane in actual flight. Link 58 and the upper end of lever 60 move toward the rear, the bottom of lever 60 is moved toward the head of the fuselage increasing the tension upon spring 70. The size of the opening of the needle valve within bellows 74 is therefore increased and the source of vacuum 87 acting through tube 86 will decrease the pressure within the bellows.

It should be noted, therefore, that a diving attitude of the trainer fuselage opens the needle valve within bellows 74 thereby causing a decrease in the pressure contained within this bellows, while a climbing attitude of the trainer fuselage causes a closing of the needle valve and, therefore, an increase in the pressure within bellows 74.

Still referring to Fig. 2, if throttle 30 be pushed toward the head of the trainer fuselage, that is, to the left in Fig. 2, in simulation of the opening of the throttle in a plane, the bottom end of the throttle will move in the opposite direction as will the upper end of bell crank 36, link 40 will move downwardly as will arm 42 and shaft 44 will rotate in a direction to cause the upper end of arm 46 to move to the rear. Link 48 will move in the same direction as will the lower end of arm 50, in this instance arm 50 pivoting about shaft 54. Link 58 will move in the same direction as will the upper end of arm 60. Link 68 will move to the left, as seen in Fig. 2, the tension upon spring 70 will be increased, and the needle valve within bellows 74 will therefore be opened, allowing the source of vacuum to reduce the pressure within this bellows.

It will be understood without further explanation that a closing of throttle 30, that is, movement to the right in Fig. 2, will cause the tension upon spring 70 to decrease, reducing the opening of the needle valve within bellows 74 and, therefore, causing an increase in the pressure within the bellows.

It will therefore be seen that an opening of throttle 30 causes an opening of the needle valve within bellows 74 just as does a diving attitude of the trainer fuselage, while a closing of throttle 30 and a climbing attitude of the trainer fuselage cause a closing of the needle valve within this bellows.

The left end of link 68 is threaded and nut 69 allows an exact adjustment of the spring 70.

As previously explained, air speed regulator bellows 74 is preferably made of an airtight light metal construction. Communicating with its interior through coupling 113 is a hollow tubing 112, the other end of which is connected to air speed transmitter designated generally in Fig. 2 by 114. Bleed hole 116 is placed in tube 112. The general position of air speed transmitter 114 is, as shown in Fig. 1, upon platform 18.

Whenever the tension upon spring 70 is increased by an opening of the throttle or by a diving attitude of the trainer fuselage 10, member 72 pulls the forward end plate 78 of bellows 74 to the left in Fig. 2 and, therefore, cap 80 and needle 82 are moved to such a position that the needle valve within the bellows is opened. Reduced air pressure will therefore be applied in greater magnitude to the interior of the bellows 74, and as the air pressure therewithin becomes gradually reduced, atmospheric pressure upon the outside of bellows 74 causes the same to collapse, thereby drawing link 72 to the right in Fig. 2 and forcing needle 82 into its seat 84, thereby decreasing the size of the valve opening. This gradual collapse of bellows 74 and closing of the needle valve continues until the pressure within the bellows and the tension of spring 70, both of which forces tend to expand bellows 74, exactly equal the atmospheric pressure on the outside of bellows 74, which latter force tends to collapse the bellows. When these opposing forces are balanced, the source of vacuum 87 acting through tube 86 will exhaust from bellows 74 the same amount of air that enters the system through bleed hole 116.

Because of the above equation of forces, by varying the tension upon spring 70 the amount of vacuum necessary within bellows 74 to balance the atmospheric pressure on the outside of the bellows may be varied. As above explained, an opening of throttle 30 and the pitching of the trainer fuselage 10 to a diving attitude causes an increase in the tension upon spring 70 and, therefore, a higher vacuum within bellows 74. A closing of throttle 30 and a climbing attitude of the trainer fuselage, on the other hand, causes a decrease in the tension upon spring 70 and, therefore, a lower vacuum within bellows 74.

When the air speed of a plane (the speed of the plane through the surrounding air) increases, two significant results occur. First, the air speed indicator shows a change in the indication given, and secondly, the speed of travel of the plane over the ground, commonly referred to as its ground speed, changes. The indicated air speed of a plane as well as its ground speed increases with an opening of the throttle and with a diving of the ship (unless the ship's attitude is too vertical) and as just explained, the pressure within bellows 74 decreases with an opening of the throttle and a diving of the trainer fuselage. The indicated air speed of a plane as well as its ground speed decreases with a closing of the throttle and with a climbing attitude while the pressure within bellows 74 increases with a closing of the throttle within the trainer fuselage and with a climbing attitude of the fuselage. It will be realized, therefore, that if an indicator responsive to the pressure within bellows 74 is connected thereto, said indicator showing an assumed trainer air speed inversely proportional to the pressure within bellows 74, the indicated air speed of the trainer will increase with an opening of throttle 30 and with a diving attitude of the trainer fuselage 10 just as the air speed of a plane in actual flight increases with an opening of the throttle therein and a diving of the plane. Also, the air speed as indicated by the indicator within the trainer fuselage 10 will show a decreased assumed air speed with a closing of throttle 30 and with a climbing attitude of the trainer fuselage in simulation of the decreasing of the air speed of a plane in actual flight with a closing of the throttle in the plane or with a climbing of the plane. Furthermore, if means be provided whereby the speed of the recorder is also inversely proportional to the pressure within bellows 74, the speed of the recorder will increase and decrease in response to throttle movements and trainer attitudes in simulation of the increases and decreases in the speed of travel of a plane in actual flight over the ground in response to corresponding throttle movements and ship attitudes. Means for accomplishing these results will now be described.

*Air speed transmitter*

Figure 3:
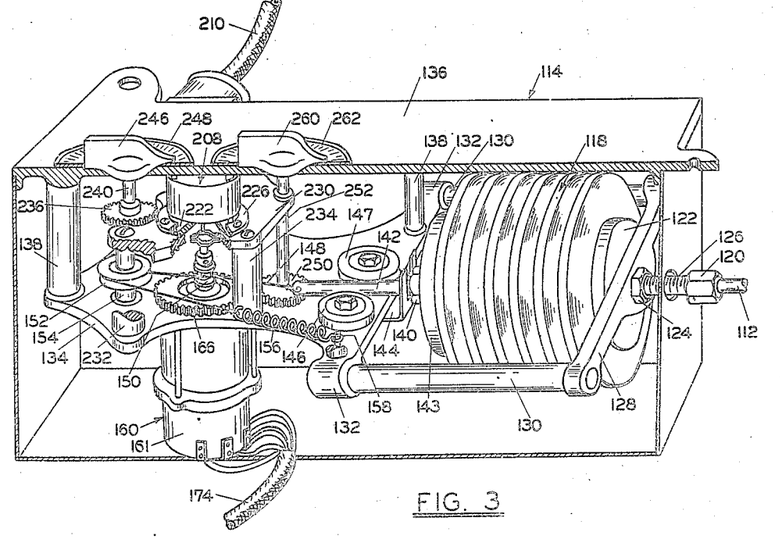
Fig. 3 is a perspective view of the preferred form of my air speed transmitter.

Referring now to Figs. 2 and 3, it will be seen that by means of connection 112, air speed regulator bellows 74 is in direct connection with the interior of air speed transmitter bellows 118. A suitable coupling comprising tube 112, nut 120, and exteriorly threaded connection 126 which is rigidly mounted to end 122 of bellows 118 assure an air tight communication between bellows 74 and bellows 118, except for bleed hole 116. The right end 122 of bellows 118, as seen in Fig. 3, is held snugly against yoke 128 by means of nut 124 which cooperates with threaded connection 126. Yoke 128 in turn is rigidly held by a pair of longitudinally extending spacers 130, the left ends of which are rigidly held by proper receiving portions 132 formed integrally with a casting 134 which is spaced from the top 136 of the air speed transmitter by means of a plurality of spacers 138.

Figure 4:
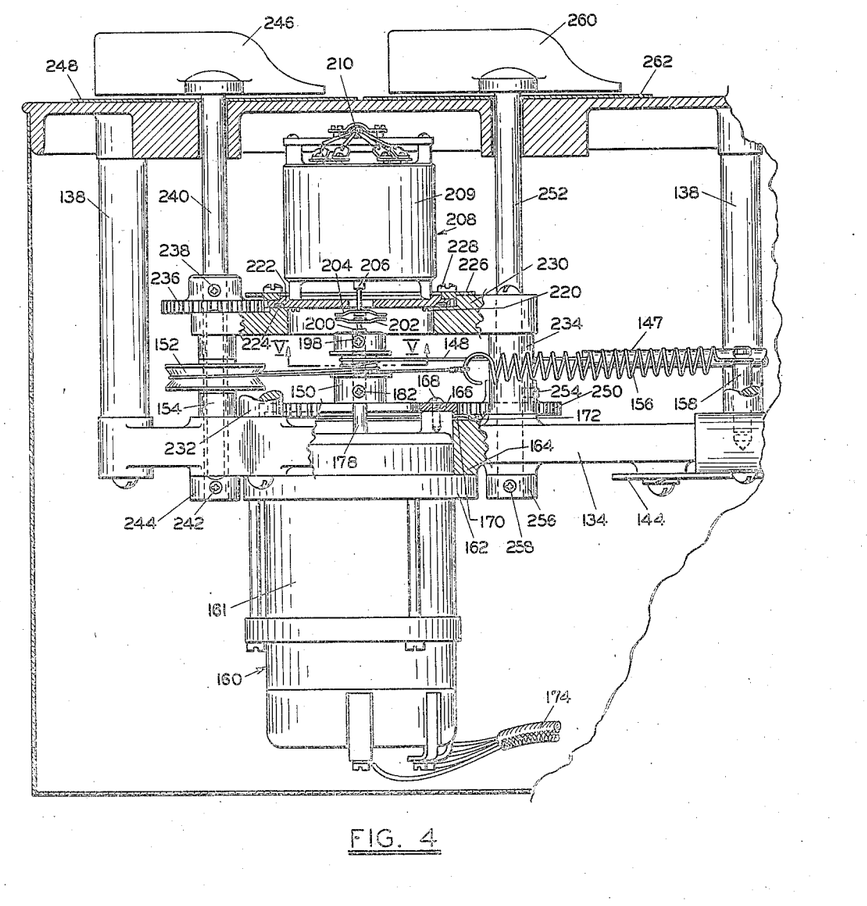
Fig. 4 is a side view of the air speed transmitter, certain parts being broken away and shown in cross section.
Figure 5:
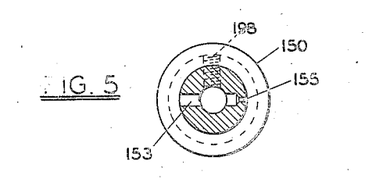
Fig. 5 is a cross sectional view taken on the line V—V of Fig. 4.

Shaft 142 has its right end, as seen in Fig. 3, threaded and is screwed into the end 143 of bellows 118, lock nut 140 keeping shaft 142 rigidly fixed in position. Adjustable stop 144 limits the expansion of bellows 118. Rotatable guide 146 and rotatable pulley 147 are suitably spaced from casting 134 and arranged to guide shaft 142 in order that it will at all times reciprocate along the same axis. Attached to the left end of member 142 is a flexible line 148 preferably made of a material such as braided silk, and as seen in Figs. 3 and 4, this line apparently encircles a pulley designated by 150 and then continues toward the left, encircling idler pulley 152 which is mounted upon spacer 154, the other end of this line attaching to the left end of spring 156, the right end of which is rigidly affixed to stud 158 mounted on casting 134. Reference is now made to Fig. 5 which shows an enlarged cross sectional view of the pulley 150 at the point where it is encircled by the line 148. As seen in Fig. 5, a bore having an enlarged portion 153 and a smaller portion 155 is made through this pulley, and line 148 is positioned in respect to pulley 150 in the following manner: A knot of such size that it cannot pass through the smaller portion 155 of the bore is tied in line 148 and both ends of the line are then pushed together into the enlarged portion 153, and then on through the smaller portion 155, and both ends are drawn through the bore until the knot catches upon the shoulder formed by the meeting of the two differently-sized bores. One end of the line then is wound a couple of times around pulley 150 in a counterclockwise direction, as seen from above, and is then attached to the end of shaft 142. The other end of the line is then wound a couple of times in the opposite or clockwise direction around pulley 150 and is then extended around idler pulley 152 and finally attached to the left end of spring 156. This arrangement having been accomplished, it will be readily understood that when the pressure within bellows 118 becomes sufficiently low the bellows will collapse with a resulting movement of shaft 142 to the right, as seen in Fig. 3, and pulley 150 will move counterclockwise as seen from above, spring 156 opposing this movement. However, if the pressure within bellows 118 becomes sufficiently high it will expand bellows 118 which will push rod 142 to the left, and spring 156 pulls cord 148 which rotates pulley 150 in the clockwise direction as seen from above.

Inasmuch as the interior of bellows 118 is in direct communication with the interior of bellows 74 it will be understood that the pressure within each of these bellows will at all times be the same. The pressure within bellows 118 and the tension of spring 156 tend to expand bellows 118, while the atmospheric pressure on the outside thereof tends to collapse the bellows. The position in rotation of pulley 150 therefore is dependent upon the pressure within bellows 74 and 118, which pressure, it will be recalled, is inversely proportional to the assumed air speed of the trainer. Any change in the setting of throttle 30 or in the attitude of fuselage 10 will result in a rotation of pulley 150. It is clear, therefore, that if the speed of the recorder is dependent upon the rotatable position of pulley 150 the speed of the recorder will be proportional to the assumed air speed of the trainer. Furthermore, if an instrument for indicating the assumed air speed of the trainer be responsive to the rotatable position of pulley 150 it will indicate the assumed air speed of the trainer.

*Improved means for varying speed of recorder in response to changes in throttle setting and attitude of trainer fuselage*

Means for causing the recorder to move over the chart at a speed at all times proportional to the assumed air speed of the trainer are disclosed in detail in the above-mentioned copending application of Gunne Lowkrantz and myself, Serial No. 406,056. As disclosed in that application, the speed of the recorder is made dependent upon the assumed air speed of the trainer by causing the air speed slide to have a position at all times proportional to the assumed air speed of the trainer. As partially disclosed in this copending application, positioning of the air speed slide was accomplished in the prior art by attaching to the upper end of lever 50 shown in Fig. 2 a suitable cable which has its other end wound around a takeup pulley within the housing of the wind drift instrument. This takeup pulley is spring-biased in one direction and cooperates with a conventional two-way follow-up motor. As the cable is pulled in response to an opening of the throttle or diving of the fuselage the takeup pulley is turned thereby actuating the follow-up motor which moves the air speed slide in such a direction that the speed of the recorder is increased. On the other hand, when the throttle is closed or the fuselage climbed, the spring turns the pulley in the opposite direction and the motor has an output in the reverse direction, positioning the air speed slide so that the recorder moves at a slower rate.

The outstanding disadvantage of the arrangement of the prior art is that a movement of the throttle or change in the attitude of the trainer fuselage instantly produces a change in the position of the air speed slide and, therefore, an instantaneous change in the rate of travel of the recorder. Such a response does not accurately simulate changes in the ground speed of a plane in response to changes in throttle setting or attitude because the time lag between change in throttle setting or in attitude of the plane and the resulting change in ground speed of the plane is not present in the response of the rate of travel of the recorder to a change in throttle position or trainer attitude. Furthermore, the air speed indicator in such a trainer in the prior art was responsive to the pressure within bellows 74 to which it was connected. The indicated air speed therefore was not instantly changed by a change in the setting of the throttle, but was gradually increased or decreased to its new value, in simulation of the gradual change of the indicated air speed of a plane in actual flight to a change in throttle setting or attitude of the plane. The speed of the recorder being instantly changed while the indicated air speed was gradually changed meant that the recorder did not accurately trace the assumed track of the trainer. The following describes that portion of my present invention which overcomes this objectionable feature of the prior art.

Referring to Figs. 3 and 4, it will be seen that a self-synchronous teletorque transmitter designated generally by 160 is provided having a housing 161 and a shoulder 162 integral with the housing, said shoulder resting against the shoulder 164 of casting 134. An annular gear 166 is attached by means of screws 168 to the upper end of the housing 161 of the transmitter, said gear being of slightly larger diameter than the housing 161 and, therefore, providing an annular portion adapted to rest upon crimpled washer 170 which in turn rests in counterbore 172 of casting 134. It will be realized that shoulders 162 and 164 limit the movement of the transmitter housing 161 upwardly and that gear 166 and crimpled washer 170 limit the movement of the housing downwardly.

Figure 6:
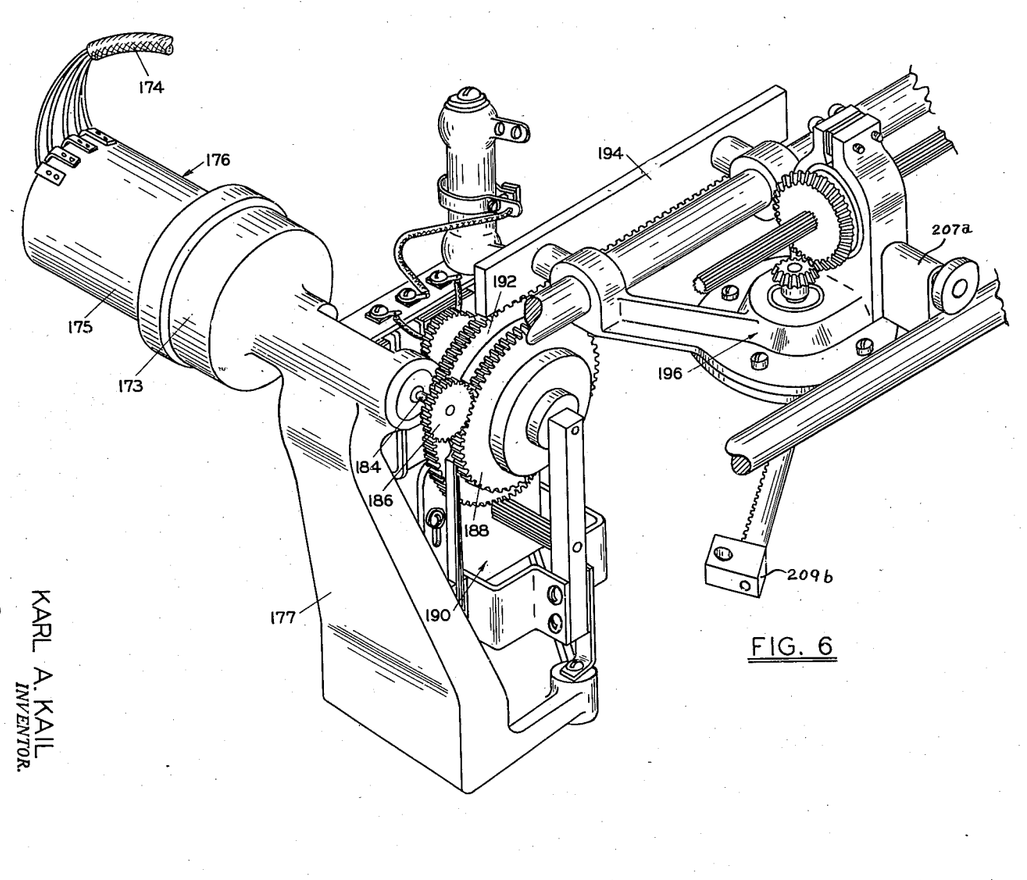
Fig. 6 is a perspective view of a portion of the wind drift instrument and certain associated parts.

Teletorque transmitter 160 is connected by means of cable 174 to teletorque receiver designated generally in Fig. 6 by 176. Housing 175 of the receiver 176 is clamped by means not shown into receiving portion 173 formed integrally with casting 177 of the wind drift instrument, a portion of which is shown in Fig. 6. The wind drift instrument is designated generally by 179 in Fig. 1. Teletorque transmitter 160 has a central input shaft 178 upon which is mounted pulley 150 which is affixed thereto by means of set screw 182. As has been previously explained, whenever air speed transmitter bellows 118 is contracted shaft 142 moves to the right pulling line 148 in the same direction and turning pulley 150 in the counterclockwise direction as seen from above. Shaft 178 will therefore be turned in the same direction. On the other hand, an expansion of this bellows allows spring 156 to turn pulley 150 and central shaft 178 in the opposite direction, and shaft 178 will turn clockwise as seen from above.

Teletorque transmitter 160 and teletorque receiver 176 which are electrically connected by means of cable 174 are of the type that whenever the input shaft 178 of teletorque transmitter 160 moves through a certain number of degrees the output shaft 184, seen in Fig. 6, of the teletorque receiver has a simultaneous movement of the same magnitude imparted to it. The electrical connection may be made so that upon a rotation of the input shaft of the transmitter in one direction the output shaft of the receiver rotates in either direction, while reversal of direction of rotation of the input shaft results in a movement of the output shaft in the opposite direction. The output shaft 184 of teletorque receiver 176 has rigidly affixed thereupon pinion 186 which is in mesh with gear 188. Whenever gear 188 is turned by pinion 186 the two-way conventional follow-up motor designated generally by 190 is energized and it rotates gear 192 by means of output shaft 191 in the same direction and through the same angle as gear 188 was turned. When this movement is accomplished the motor is automatically deenergized. Such a movement of gear 192 will move air speed rack 194 which is in mesh therewith, and air speed slide 196 moves along guide rods 195 and 197 because the air speed slide is fixedly attached to rack 194 by virtue of arms 199 (only one shown), collars 201, and studs 203 which are fixedly attached to rack 194. Roller 205 rotatably held by boss 207a of air speed slide 196 facilitates the movement of air speed slide 196. The purpose and functioning of rack 207, which pivots about point 209b of block 209a affixed upon one end of rack 207, as well as of pinion 211, bevel gear 211a and splined shaft 213 is not explained herein because these parts form no part of the instant invention. For a complete disclosure of their functioning reference is made to the copending patent application Serial Number 406,056. As described in detail in the above-mentioned copending application Ser. No. 406,056, whenever air speed slide 196 is moved to the right in Fig. 6 the speed of the recorder is increased, while a movement in the opposite direction causes a decrease in the speed of the recorder.

The pressure within bellows 118 has been shown to be inversely proportional at all times to the assumed air speed of the trainer. A decrease in the pressure within this bellows, resulting from an opening of throttle 30 or a diving of fuselage 10, results in a contraction of the bellows and rod 142 moves to the right in Fig. 3, turning pulley 150 and the central input shaft 178 of teletorque transmitter 160 in the counterclockwise direction as seen from above. The central output shaft 184 of teletorque receiver 176 will also move counterclockwise as seen in Fig. 6 and pinion 186 rigidly mounted thereupon will move in the same direction. Gear 188 will move clockwise as seen in that same figure, and the follow-up motor will become energized, turning gear 192 in a clockwise direction until it again arrives in the neutral position relative to gear 188, whereupon the follow-up motor becomes deenergized. Air speed rack 194 and air speed slide 196 will be moved to the right in Fig. 6, thereby causing, as shown in the above-mentioned copending application Ser. No. 406,056, an increase in the rate of travel of the recorder over the chart. As seen in Fig. 1, output cable 181 connects the recorder 25 to the wind drift instrument 179. Cable 181 is contained in cable 28 of Fig. 1. It is to be noticed, therefore, that by means of my invention an opening of the throttle and/or a diving attitude of the trainer fuselage causes a gradual change in the pressure within bellows 118, a gradual rotation of the central input shaft 178 of air speed transmitter teletorque, and a gradual rotation of the output shaft 184 of air speed teletorque receiver 176. A gradual movement of the air speed slide 196 to the right in Fig. 6 will take place and this movement will continue until the pressure within bellows 74 and 118 is stabilized. All the time that these changes are taking place the speed of recorder 25 will be gradually increasing, in simulation of the gradual change in the ground speed of a plane resulting from an opening of the throttle or a diving of the ship. It will be understood without a detailed explanation that a closing of the throttle or a climbing attitude of the trainer fuselage will result in a gradual decrease in the speed of recorder 25 until the pressure within bellows 74 and 118 becomes equalized. The undesirable instantaneous sudden acceleration of the recorder which resulted in the prior art constructions is therefore avoided.

*Means for varying speed of recorder according to assumed flight characteristics of the trainer*

It has just been shown that my invention provides novel means for gradually varying the speed of the recorder whenever a change in the throttle setting and/or the attitude of the trainer occurs, in simulation of the gradual varying of the ground speed of a plane in actual flight in response to a change in the throttle setting and/or attitude of the plane. It will be readily understood that for a given plane flying through air of a certain density carrying a given load, all other conditions remaining constant, a given throttle setting and a given attitude of the plane will always produce a given air speed. However, in the event a plane is flying with a heavy load, its speed will be less than if it were carrying a light load, and if for any reason its engines are producing less power, even though the throttle setting be constant, the speed of the plane will be less. Also, different ships have different flight characteristics and, therefore, even though both planes have the same throttle setting and attitude their speeds may be substantially different. In order that the effects of the different assumed flight characteristics of the trainer and different conditions under which the trainer is assumed to be flying may properly affect the rate of travel of the recorder which, it will be recalled, represents the assumed ground speed of the trainer, the following means have been incorporated in my invention.

It has been shown that rigidly affixed to the top of air speed teletorque transmitter housing 161 is an annular gear 166. As seen in Figs. 3 and 4, a second gear 250 which is rigidly affixed to shaft 252 by means of set screw 254 is arranged to drive gear 166 whenever the true air speed adjusting knob 260 which is rigidly mounted upon the top of shaft 252 is rotated. A suitable stop 256 is affixed to the lower end of shaft 252 by means of set screw 258. Scale 262 graduated to indicate miles per hour is mounted upon the top 136 of the air speed transmitter housing in cooperative relation with true air speed adjusting knob 260. A rotation of true air speed adjusting knob 260 clockwise as seen from above will cause the housing 161 of air speed transmitting teletorque 160 to rotate in the opposite direction. The position of the central input shaft 178 of this transmitting teletorque relative to the housing 161 will therefore become altered and because the output shaft 184 of the air speed teletorque receiver 176 at all times bears the same relation to its housing 175 as does the input shaft 178 of the transmitter bear to housing 161, the rotation of housing 161 about input shaft 178 will cause output shaft 184 to rotate within housing 175 through the same number of degrees that housing 161 was rotated. By suitably selectively connecting the wires in cable 174 to the two housings, the direction of rotation of shaft 184 will be in the desired direction. Pinion 186 will therefore be rotated through the same number of degrees and the follow-up motor will become actuated, moving the air speed slide to the right in Fig. 6, causing the speed of the recorder to increase. A rotation of true air speed adjusting knob counterclockwise as seen from above will, through the functioning of the same parts of my invention, cause the speed of the recorder to decrease. It is to be noted that the change in the speed of the recorder in response to a turning of knob 260 is not gradual but is instantaneous. But the instructor can make the response gradual by slowly turning knob 260.

By means of knob 260 the instructor can, therefore, alter the speed of the recorder which is primarily determined by the position of throttle 30 and the attitude of the trainer.

Inasmuch as the immediately previously-disclosed apparatus is provided in order that the instructor may vary the speed of the recorder according to the assumed flight characteristics and assumed conditions of flight of the plane which the trainer simulates, it will be understood that the direction and amount of rotation of true air speed adjusting knob 260 will vary with the assumed flight characteristics and conditions. To illustrate, when a plane having a certain attitude and throttle setting releases a heavy load such as bombs, the air speed immediately substantially increases. In order that this effect may be simulated in the trainer as soon as the crew in the trainer has supposedly released a bomb load, the instructor will turn or cause to be turned true air speed adjusting knob 260 clockwise and the speed of the recorder is increased. As another instance, over a long flight the decrease in fuel load of the plane causes an appreciable increase in the air speed of the plane even though the throttle setting be unchanged. Therefore, during the course of the flight the instructor will turn or cause to be turned true air speed adjusting knob 260 clockwise so that the speed of the recorder is properly increased.

On the other hand, when a plane becomes covered with a coating of ice, its air speed appreciably drops off even though no change in its throttle setting or attitude remains. This effect may be simulated by a turning of true air speed adjusting knob 260 counterclockwise and the speed of the recorder is decreased.

Changes in manifold pressure, revolutions per minute of the engine, altitude of the plane, type of plane and other variables affect the speed with which the plane moves through the air even though the throttle setting and attitude be unchanged. The speed of the recorder which represents the assumed ground speed of the trainer may be properly varied in accordance with the assumed conditions prevailing by a manipulation of knob 260. All of these conditions as they are assumed to be or occur may be made to properly affect the speed of the recorder by a manipulation of true air speed adjusting knob 260. Therefore, with my invention, the speed of the recorder as primarily determined by the position of the throttle and attitude of the trainer may be varied in accordance with the assumed flight characteristics of the trainer and assumed conditions of flight in simulation of the varying of the speed of a plane in actual flight caused by the different flight characteristics of the plane and conditions encountered in actual flight other than throttle setting and attitude.

*Means for varying assumed indicated air speed in response to changes in throttle setting and attitude of trainer fuselage*

It will be recalled that pulley 150 is rotated counterclockwise as seen from above whenever throttle 30 is opened or the fuselage 10 dived, and it is rotated clockwise whenever the throttle is closed or fuselage climbed. If this rotation be made to actuate a simulated air speed indicator instrument it will be readily understood that the indicated simulated air speed of the trainer may be made to vary with a change in throttle setting or trainer attitude.

It will be seen from Fig. 4 that pulley 150 to which reference has been previously made has fixed therewithin by means of set screw 198 for simultaneous rotation therewith a shaft 200 upon the upper end of which is rigidly affixed magnetic element 202. A second magnetic element 204 is rigidly affixed to the central input shaft 206 of indicated air speed telegon transmitter 208, and these two elements form a magnetic coupling. It will be understood that a rotation of element 202 causes a rotation of element 204 in the same direction and through the same number of degrees. Telegon transmitter 208 is connected by means of cable 210 to telegon receiver 212, as seen in Fig. 2, and the output shaft 214 of which is connected to the hand 216 of air speed indicator which is designated generally by 215. Hand 216 moves over air speed indicator dial 218 to indicate the assumed air speed of the trainer. Air speed indicator 215 is on the panel before the pilot's position in fuselage 10, and an auxiliary air speed indicator, which gives the same indication as that on the pilot's panel, is provided on the instructor's desk. This auxiliary instrument is designated in Fig. 1 by 215a. The central shaft 206 of indicated air speed telegon transmitter 208 is connected to the central shaft 214 of indicated air speed telegon 212 in such a manner that the output shaft 214 always rotates through the same number of degrees as does shaft 206. The direction of rotation of the output shaft may be in either direction, depending upon the construction of the instrument. Therefore, an opening of throttle 30 or a diving attitude of the trainer fuselage 10 which causes a decrease in the pressure within bellows 74 and 118 will cause a rotation of input shaft 206 counterclockwise as viewed from above, receiver 212 is wired to transmitter 208 so that a clockwise rotation of shaft 214 as seen in Fig. 2 will result, and the indicated air speed will rise. On the other hand, a closing of throttle 30 or a climbing attitude of the trainer fuselage 10 will result in opposite movements of the aforedescribed parts and a decrease in the indicated air speed will occur.

From the foregoing it will be realized that my invention provides improved means for causing the indicated air speed in a grounded aviation trainer to vary in response to changes in the setting of the throttle in the trainer and to changes in the attitude of the trainer, in simulation of the variations of the indicated air speed of a plane in flight to changes in throttle setting and attitude.

It is also to be noticed that whenever the position of the throttle or trainer fuselage changes, the pressure within bellows 74 and 118 is gradually changed, pulley 150 is gradually rotated, and by means of the above-described teletorque and telegon systems the indicated air speed as shown by the air speed indicator and the speed of the recorder are gradually changed, in simulation of the gradual changing of the indicated air speed and movement of the plane over the ground in response to changes in the throttle setting and attitude of the plane. As the indicated air speed increases so does the speed of the recorder; and vice versa. This synchronism of the changes in indicated air speed and speed of travel of the recorder is a distinct improvement over the prior art.

*Means for simulating the effects of differential between true air speed and indicated air speed of a plane in flight*

The air speed indicator in a plane in actual flight is designed to indicate the rate of travel of the plane through the surrounding mass of air. Standard aircraft air speed indicators are designed to give the exact speed of the plane through this mass of air under standard conditions, namely, at sea level with a prevailing temperature of 15° C. It is a well known principle of physics that an increase in altitude causes a net decrease in the density of the air, even though the temperature decreases; the result being the higher the altitude of the plane the lower the reading of the air speed indicator, even though the speed of the plane through the air be constant. The actual speed of the plane through the air is known as its true air speed. The air speed indicator shows the indicated air speed. The two are equal only when the plane is flying through air of standard density, and as stated, the higher the altitude of the plane the greater the true air speed exceeds the indicated air speed. Also, the faster the true air speed, the greater the deficiency of the indicated air speed.

As has been previously shown, air speed indicator 215 indicates changes in the assumed air speed due to the positioning of throttle 30 and attitude of fuselage 10. However, as there described, the reading of air speed indicators 215 and 215a is not responsive to changes in the assumed altitude of the trainer, and therefore, even though the trainer were assumed to be flying at an altitude of several thousand feet; indicators 215 and 215a would show no dropping off as is the case when a plane is actually flying at an altitude of several thousand feet. The student in the trainer would therefore receive an indication equal to the assumed true air speed of the trainer, an indication which the pilot of a plane never receives except, of course; for standard conditions.

The above-mentioned U. S. Patent 2,099,857 discloses and claims means for causing an altimeter in a trainer of this type to indicate the assumed altitude of the trainer in response to throttle settings and trainer attitudes in simulation of the manner that an altimeter in a plane in actual flight indicates the altitude of the plane. In a trainer of this type, the instructor's desk 27 is provided with an altimeter which gives the same indicated altitude as the one before the pilot in the trainer. The instructor's altimeter is shown in Fig. 1 and is designated 223.

In order that this dropping off of the indicated air speed of a plane flying at an altitude may be simulated in the trainer the following means have been provided:

As seen in Figs. 3 and 4, telegon transmitter 208 has affixed to its lower end by means of screws 220 gear 222 which is recessed for the reception of crimpled washer 224 upon which it rests. Retaining ring 226 is attached by means of screws 228 to a metal frame casting 230 which is maintained in position by means of spacers 232 and 234. A second gear 236 is affixed by means of set screw 238 to shaft 240, the lower end of which passes through casting 134 and has affixed thereupon by means of set screw 242 a stop 244. Rigidly affixed to the upper end of shaft 240 for rotating the same is control knob 246 which, as seen in Fig. 3, passes over a dial 248, also graduated in miles per hour. It will be readily understood that a turning of knob 246 will cause shaft 240 and gear 236 to turn and this gear, being in mesh with gear 222, will cause it to turn, rotating telegon transmitter housing 209 about its central input shaft 206 which is prevented from turning because of the magnetic coupling elements 202 and 204. This rotation of housing 209, however, changes the relative position of the housing 209 to the central shaft 206 and, therefore, the central shaft 214 of the receiving telegon will be caused to turn through the same angle as housing 209 was rotated. Such a turning will of course change the position of hand 216 relative to dial 218 and the indicated air speed will therefore be modified. It is to be noticed that a turning of knob 246 does not affect teletorque transmitter 160 and, therefore, the speed of the recorder is not affected. The indicated air speed as shown by indicators 215 and 215a only is changed. The indicated air speed will be decreased by the instructor by turning indicated air speed adjustment knob 246 by that amount which will cause the indicated assumed air speed as shown by instruments 215 and 215a to be less than the assumed true air speed as used to control the speed of the recorder by the same amount that the indicated air speed of a plane in flight would be less than the true air speed of a plane actually flying at the altitude and temperature and speed that the trainer is assumed to be flying.

The instructor can determine this differential by a reference to the standard navigational aid known as a computer. The student navigator in the trainer will, therefore, from a reading of the indicated air speed, assumed altitude and assumed temperature of the air surrounding the trainer have to compute the true air speed of the trainer, just as the navigator of a plane in actual flight has to compute the true air speed of the plane from corresponding data.

If it be assumed that the air speed indicators 215 and 215a do show the assumed indicated air speed of the trainer, i. e., that it has fallen off with an increase in the assumed altitude of the trainer, the instructor may introduce the correct differential between the reading of instruments 215 and 215a, on the one hand, and the position of air speed slide 196 and speed of the recorder 25, on the other hand, by turning true air speed adjusting knob, leaving alone indicated air speed adjusting knob 246. The student will have to calculate his true air speed in the same manner previously explained.

It has been stated that various conditions of flight and various types of planes result in different speeds of travel through the air for comparable throttle settings and plane attitudes. True air speed adjusting knob 260 has been provided by this invention to make possible different rates of travel of the recorder in order that the effects of these different conditions and different types of planes may be simulated. Whenever the true air speed of a plane in actual flight varies with different flight characteristics and conditions, it should be borne in mind that the indicated air speed of the plane will also vary. For example, as the load of a plane decreases, other factors remaining constant, the true air speed as well as the indicated air speed of the plane increases. Consequently, whenever true air speed adjusting knob 260 is turned to increase or decrease the speed of the recorder to simulate changes in true air speed resulting from a change in conditions of flight or from the assumed flight characteristics, indicated air speed adjusting knob 246 must be used to change the indicated air speed. But, indicated air speed adjusting knob 246 will always be set in order that the correct differential may be maintained between the assumed true air speed of the trainer as used to govern the speed of the recorder and the assumed indicated air speed as shown by air speed indicators 215 and 215a. In a plane in actual flight, this differential depends upon three factors, namely, altitude of the plane, temperature of the air surrounding the plane, and the true air speed of the plane. The various conditions of flight and flight characteristics of the plane affect this differential only to the extent that they affect the altitude or true air speed of the plane. The instructor will maintain the differential between the true air speed as used to govern the speed of the recorder and the indicated air speed as shown by air speed indicators 215 and 215a by a consideration of the assumed altitude, true air speed and temperature of the air surrounding the trainer in its "flight."

Operation

In order that the usefulness of my invention may be fully appreciated, let us assume that the pilot in the trainer "takes off," and let us assume that the "take-off" is under standard atmospheric conditions, namely, sea level and a temperature of 15° C. As the throttle is opened the pressure within bellows 74 and 118 becomes decreased and air speed indicator 215 will give an indicated air speed equal to the assumed true air speed of the trainer while the recorder 25 will move forward over the chart 26 at a rate proportional to the true air speed of the trainer, as it should. The successive throttle positions and trainer attitudes will affect the pressure within bellows 74 and 118 and the air speed indicators 215 and 215a will properly respond to these factors as will the forward speed of the recorder 25. As soon as the altimeter within the trainer indicates that the assumed altitude of the trainer is above sea level, inasmuch as the air speed indicators 215 and 215a are indicating the assumed true air speed of the trainer, the instructor will turn indicated air speed adjusting knob 246 the correct amount to cause the air speed as indicated by instruments 215 and 215a to fall off by the same amount that the indicated air speed of a plane in actual flight would fall off if the plane were flying at the altitude indicated by the altimeter in the trainer and the assumed true air speed of the trainer and in air of the temperature assumed. Throughout the course of the flight the instructor will change the setting of the indicated air speed adjusting knob so that the proper differential prevails between the indicated air speed and the speed of the recorder. Thus far, the speed of travel of the recorder has been governed solely by the successive positions of the throttle and attitudes of the trainer because no flight characteristics or conditions of flight other than throttle setting and trainer attitude have been assumed which would alter the true air speed of the plane as the "flight" progresses. However, the fuel load becomes lighter and the instructor must turn true air speed adjusting knob 260 clockwise in order that the speed of the recorder will be increased. At the same time, he must turn indicated air speed adjusting knob 246 to increase the indicated air speed because as the true air speed of a plane increases as a result of factors other than throttle setting and attitude so does the indicated air speed. If it be assumed that the trainer encounters icing conditions, true air speed adjusting knob 260 must be turned counter-clockwise to slow down the speed of the recorder and indicated air speed adjusting knob 246 must be turned to decrease the indicated air speed. As any other condition of flight is assumed to occur, or any other flight characteristic which would change the true air speed of a plane is assumed, true air speed adjusting knob 260 will be turned to increase or decrease the speed of the recorder, depending upon whether that condition would increase or decrease the true air speed of a plane in actual flight. At the same time, the indicated air speed adjusting knob must be turned to maintain between the true air speed and the indicated air speed the same differential which would exist between the indicated air speed and the true air speed of a plane in actual flight if the plane were flying at the altitude and true air speed at which the trainer is assumed to be flying and if the plane were flying through a mass of air having the temperature that the air through which the trainer is assumed to be flying is assumed to have.

Conclusion

From the foregoing it will be understood that by means of my invention the following advantages are realized: first, a proper time lag between a change in the position of the throttle and/or a change in the attitude of the trainer and a change in the speed of travel of the recorder is introduced in simulation of the time lag between a change in the throttle setting of a plane and/or a change in the attitude of the plane and the resulting change in the ground speed of the plane. This improvement has the accompanying advantage that the assumed indicated air speed of the trainer as shown by air speed instruments 215 and 215a changes simultaneously with the change in the rate of travel of the recorder. Secondly, it is possible to have the recorder move over the chart at a rate proportional to the assumed true air speed of the trainer while the air speed indicator shows an air speed less than the assumed true air speed of the trainer by a proper differential which is dependent upon the assumed altitude of the trainer, assumed temperature of the air surrounding the trainer and assumed true air speed of the trainer, just as the air speed indicator of a plane in flight is at variance with the speed of the plane through the air by a differential dependent upon its altitude, the temperature of the air through which it is flying, and its actual rate of travel through the air. Thirdly, it is possible to vary the speed of travel of the recorder over the chart and at the same time vary the indicated air speed in accordance with the assumed conditions of flight and assumed characteristics of the aircraft which the trainer represents.

The foregoing being but a preferred embodiment of my invention, I limit myself only by the prior art and the following claims:

1. In a grounded aviation training system of the type comprising a fuselage mounted upon a stationary member for pitching in simulation of the climbing and diving of a plane in actual flight, a throttle lever in the fuselage and means connected to said fuselage for indicating the simulated path of flight of said fuselage, the combination of a movable part, means responsive to the pitching of said fuselage and the movements of said throttle lever for positioning said movable part in accordance with the combined attitude of said fuselage and position of said throttle lever, intermediate controlling mechanism connected to said movable part, means for determining the rate of speed of said indicating means, and a connection from said mechanism to said last named means, said mechanism including means for gradually transmitting the movement of said part to said means for determining the rate of speed of said indicating means until the forward speed of said indicating means reaches the predetermined speed for the existing combined attitude and throttle lever position.

2. In a grounded aviation training system of the type comprising a fuselage having a place for a student, a throttle lever in the fuselage and means connected to said fuselage for indicating the simulated path of flight of said fuselage, the combination of a movable part, a connection from said throttle lever to said movable part for positioning said part in accordance with the position of said throttle lever, intermediate controlling mechanism connected to said movable part, means for determining the rate of speed of said indicating means, and a connection from said mechanism to said last named means, said mechanism including means for gradually transmitting the movement of said part to said means for determining the rate of speed of said indicating means until the forward speed of said indicating means reaches the predetermined speed for the existing throttle lever position.

3. In a grounded aviation training system of the type comprising a fuselage mounted upon a stationary member for pitching in simulation of the climbing and diving of a plane in actual flight, a throttle lever in the fuselage and means connected to said fuselage for indicating the simulated path of flight of said fuselage, the combination of a movable part, means responsive to the pitching of said fuselage and to movements of said throttle lever for positioning said part in accordance with the combined attitude of said fuselage and position of said throttle lever, intermediate controlling mechanism connected to said movable part, said intermediate controlling mechanism comprising a pressure containing member, means responsive to a change in the position of said movable part for gradually changing the pressure within said pressure containing member until the pressure therewithin reaches the predetermined level for the existing combined attitude and throttle lever position, means for determining the rate of speed of said indicating means, and a connection from said pressure containing member to said speed determining means for causing said speed determining means to propel said indicating means at a rate dependent upon the pressure within said pressure containing member.

4. In a grounded aviation training system of the type comprising a fuselage having a place for a student, a throttle lever in the fuselage and means connected to the fuselage for indicating the simulated path of flight of the fuselage, the combination of a movable part, a connection from said throttle lever to said movable part for positioning said part in accordance with the position of said throttle lever, intermediate controlling mechanism connected to said movable part, said intermediate controlling mechanism comprising a pressure containing member, means responsive to a change in the position of said movable part for gradually changing the pressure within said pressure containing member until the pressure therewithin reaches the predetermined level for the existing throttle lever position, means for determining the rate of speed of said indicating means, and a connection from said pressure containing member to said speed determining means for causing said speed determining means to propel said indicating means at a rate dependent upon the pressure within said pressure containing member.

5. In a grounded aviation training system of the type comprising a fuselage mounted upon a stationary member for pitching in simulation of the climbing and diving of a plane in actual flight, a throttle lever in the fuselage, means connected to said fuselage for indicating the simulated path of flight of said fuselage, an instrument in said trainer, said instrument comprising a member whose position is at all times proportional to the assumed air speed of the fuselage, said indicating means being connected to said instrument and the forward speed of said indicating means being responsive to the position of said member, the combination of a movable part, means responsive to the pitching of said fuselage and movements of said throttle lever for positioning said part in accordance with the combined attitude of said fuselage and position of said throttle lever, an intermediate controlling mechanism connected to said movable part, said intermediate controlling mechanism comprising a pressure containing member, means responsive to the change in the position of said movable part for gradually changing the pressure within said pressure containing member until the pressure therewithin reaches the predetermined level for the existing combined attitude and throttle lever setting, and a connection from said pressure containing member to said member in said instrument, said intermediate controlling mechanism comprising means for transmitting the change in pressure within said pressure containing member to said first mentioned member whereby said first mentioned member is gradually moved to the predetermined position corresponding to the position of said movable part.

6. In a grounded aviation training system of the type comprising a fuselage having a place for a student, a throttle lever in the fuselage, an air speed indicator for indicating the assumed air speed of said trainer and means connected to said fuselage for indicating the simulated path of flight of said fuselage, the combination of a movable part, a connection from said throttle lever to said movable part for positioning said part in accordance with the position of said throttle lever, intermediate controlling mechanism connected to said movable part, a connection from said mechanism to said air speed indicator and a connection from said mechanism to said path of flight indicating means, said mechanism including means for gradually transmitting the movement of said movable part to said air speed indicating means and to said path of flight indicating means until the indication of said air speed indicator reaches the predetermined reading and the forward speed of said path of flight indicating means reaches the predetermined speed for the existing throttle lever position, in simulation of the gradual change in the indicated air speed and ground speed of a plane in actual flight to a change in its throttle lever position.

7. In a grounded aviation training system of the type comprising a fuselage mounted upon a stationary member for pitching in simulation of the climbing and diving of a plane in actual flight, a throttle lever in the fuselage, an air speed indicator for indicating the assumed air speed of said trainer and means connected to said trainer for indicating the simulated path of flight of said fuselage, the combination of a movable part and an intermediate controlling mechanism including a pressure containing member, means responsive to the pitching of said trainer and to movements of said throttle lever for positioning said part in accordance with the combined attitude of said fuselage and position of said throttle lever, said mechanism also including means responsive to a change in the position of said movable part for gradually changing the pressure within said pressure containing member until the pressure therewithin reaches the predetermined level for the existing combined attitude and throttle lever position, a connection from said pressure containing member to said air speed indicator and a connection from said pressure containing member to said path of flight indicating means, said pressure containing member gradually transmitting the movement of said movable part to said air speed indicator and path of flight indicating means until the reading of said indicator reaches the predetermined reading and the speed of said path of flight indicating means reaches the predetermined speed for the existing combined attitude and throttle lever position, in simulation of the gradual change in the indicated air speed and ground speed of a plane in actual flight to a change in its throttle lever position or attitude.

8. In a grounded aviation training system of the type comprising a fuselage mounted upon a stationary member for pitching in simulation of the climbing and diving of a plane in actual flight, a throttle lever in the fuselage, an air speed indicator in the fuselage for indicating the assumed air speed of said fuselage and a flight simulating device connected to said fuselage for tracing the simulated path of flight of said fuselage, the combination of a first means responsive to the combined attitude of said fuselage and position of said throttle lever for actuating said air speed indicator and for propelling said flight simulating device according to the assumed true air speed of said fuselage, and additional control means under the control of the instructor for decreasing the reading of said air speed indicator determined by said first means, whereby a differential dependent upon the assumed conditions of flight of the fuselage may be introduced between the proportional rate of travel of the flight simulating device and the indicated air speed, in simulation of the differential between the indicated air speed and true air speed of a plane in actual flight.

9. In a grounded aviation training system of the type comprising a fuselage mounted upon a stationary member for pitching in simulation of the climbing and diving of a plane in actual flight, a throttle lever in the fuselage, an air speed indicator in the fuselage for indicating the assumed air speed of said fuselage and a flight simulating device connected to the fuselage for indicating the simulated path of flight of said fuselage, the combination of a movable part, means responsive to the pitching of said fuselage and movements of said throttle lever for positioning said part in accordance with the combined attitude of said fuselage and position of said throttle lever, means for actuating said air speed indicator in accordance with the position of said movable part and means for propelling said flight simulating device at a rate dependent upon the position of said movable part, and additional means for decreasing the reading of said air speed indicator whereby a differential dependent upon the assumed attitude of said fuselage may be introduced between the proportional rate of forward movement of said flight simulating device and the indicated air speed, in simulation of the differential between the indicated air speed and true air speed of a plane in actual flight.

10. In a grounded aviation training system the combination of a fuselage, a throttle lever in said fuselage, a valve and a connection between said valve and said throttle lever whereby said valve is operated by said throttle lever, a fluid source and a connection between the same and said valve, a relatively large expansible-collapsible member and a connection between said member and said valve, a pair of electrical transmitting devices connected to said collapsible-expansible member to be operated thereby, an indicator for indicating the assumed air speed of said fuselage, said indicator including an electrical receiving device operatively connected to one of said electrical transmitting devices to have its indication controlled thereby, and a flight simulating device arranged to move over a surface at a rate of speed dependent upon the assumed true air speed of said fuselage, said flight simulating device including an electrical receiver operatively connected to the other of said electrical transmitters to have its rate of speed controlled thereby.

KARL A. KAIL.

REFERENCES CITED

The following references are of record in the file of this patent:

UNITED STATES PATENTS

| Number | Name | Date |
|---|---|---|
| 1,825,462 | Link | Sept. 29, 1931 |
| 2,099,857 | Link | Nov. 23, 1937 |
| 2,179,663 | Link | Nov. 14, 1939 |
| 2,298,305 | Muller | Oct. 13, 1942 |
| 2,326,764 | Crane | Aug. 17, 1943 |
| 2,358,018 | Lowkrantz | Sept. 12, 1944 |
| 2,359,866 | Lowkrantz | Oct. 10, 1944 |
| 2,366,603 | Dehmel | Jan. 2, 1945 |